March 31, 1970  E. E. HADLEY  3,503,664
FLUID TELESCOPE MOUNTING SYSTEM
Filed July 19, 1966  3 Sheets-Sheet 1
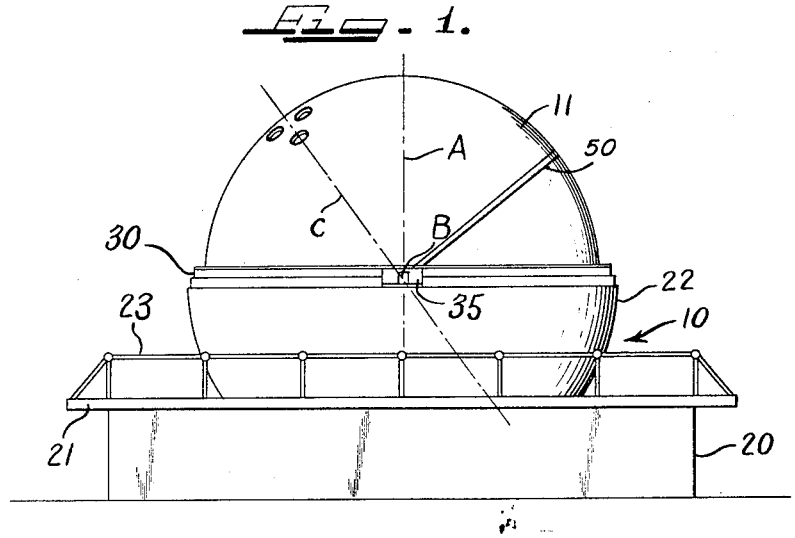
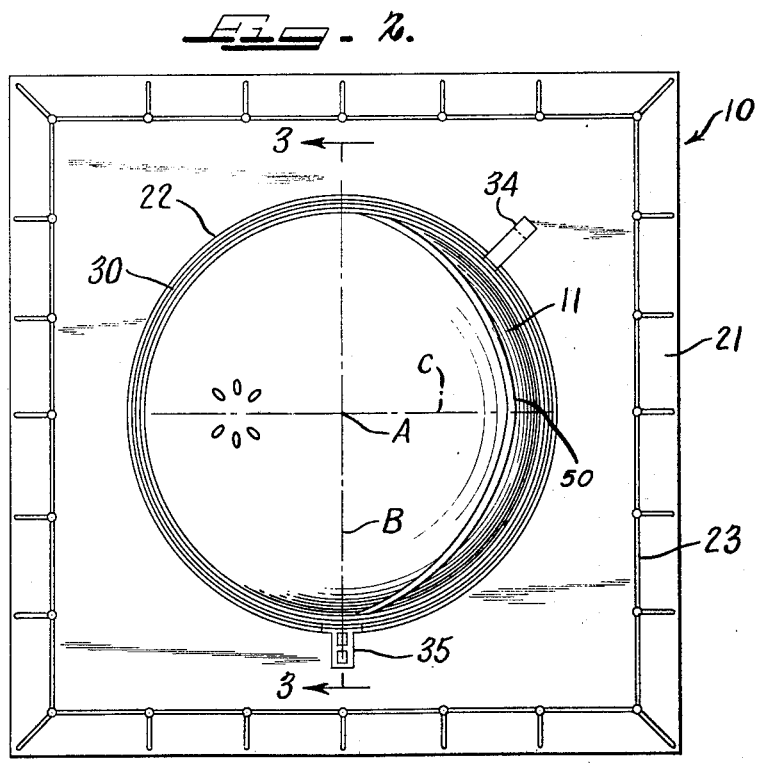
INVENTOR
EMERSON E. HADLEY
BY Mason, Albright & Stansbury
Attys.

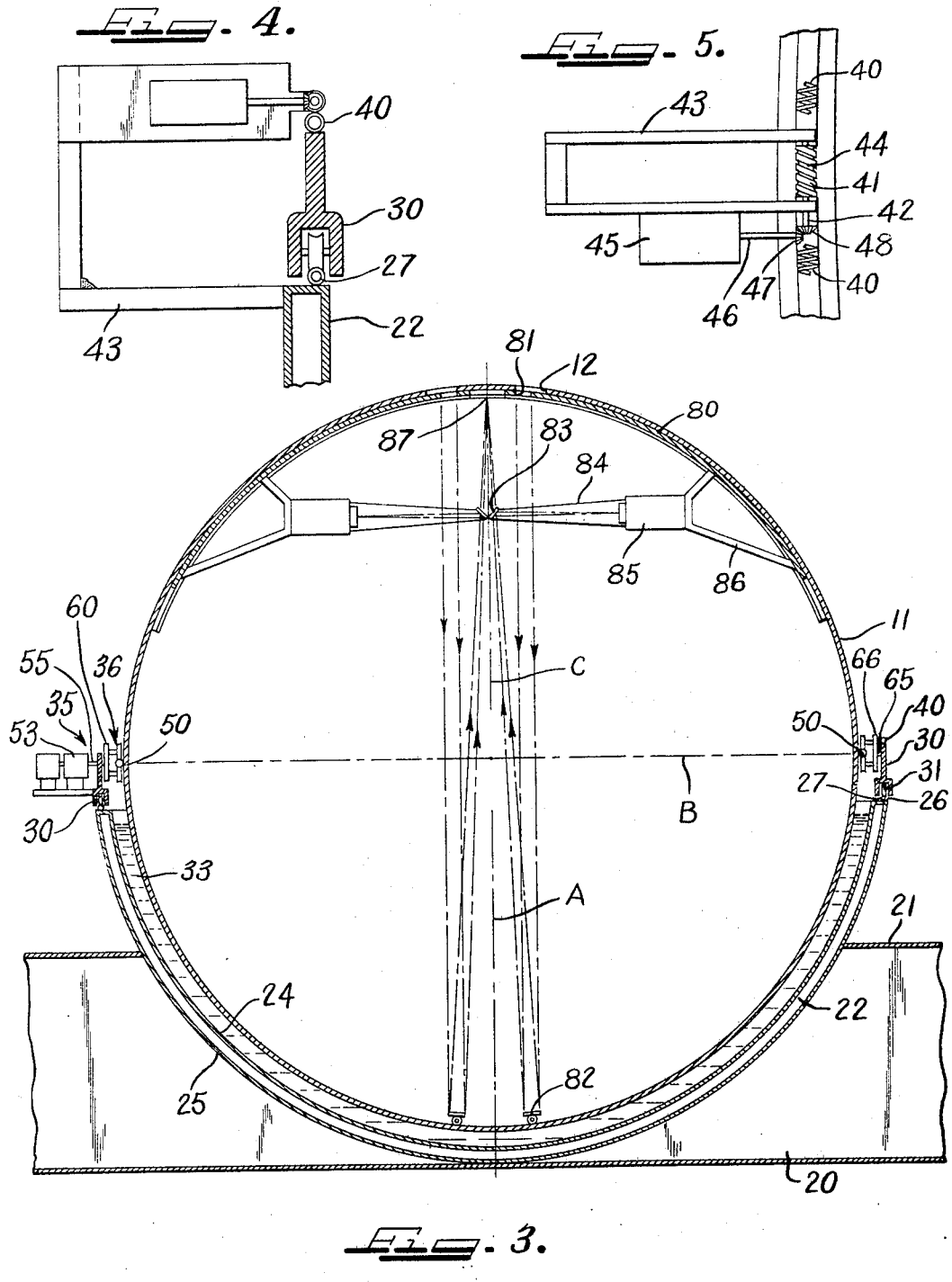

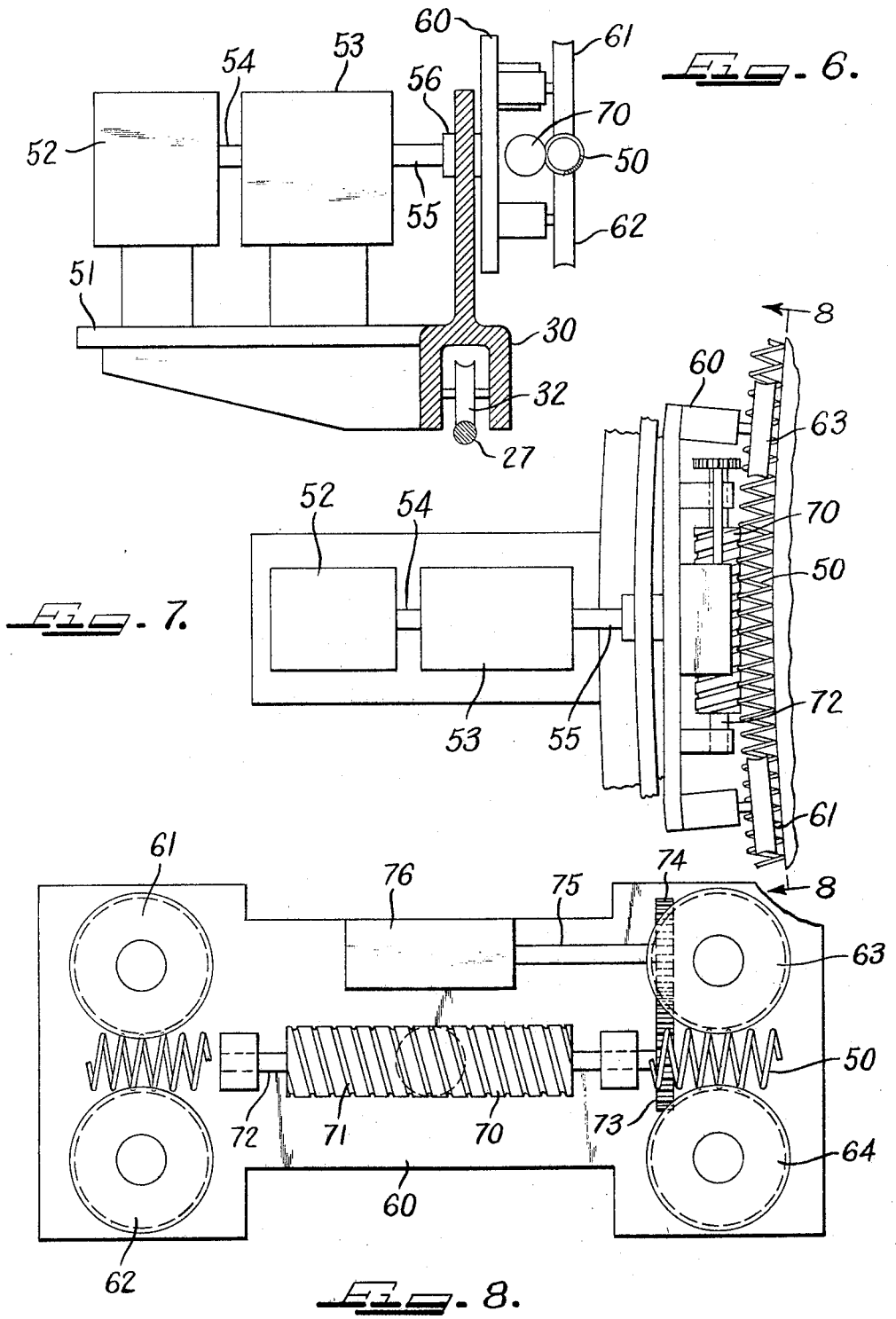

////# United States Patent Office 3,503,664
Patented Mar. 31, 1970

3,503,664
FLUID TELESCOPE MOUNTING SYSTEM
Emerson E. Hadley, Eau Gallie, Fla. 32935; Doris J. Hadley, Eau Gallie, Emerson Rea Hadley, Titusville, and Joanne B. Long, Eau Gallie, Fla., heirs of said Emerson E. Hadley, deceased
Filed July 19, 1966, Ser. No. 566,319
Int. Cl. G02b 17/00
U.S. Cl. 350—55                7 Claims

ABSTRACT OF THE DISCLOSURE

Heavy devices such as a long focal length telescope are mounted with the bearings of the drive systems thereof supporting substantially none of the weight of the supported device. Substantially all of the weight is supported by fluid floatation of a sphere having three axes of rotational freedom.

The present invention relates to a movable mounting system and more particularly to a mounting system for movably supporting large and heavy devices such as large reflecting telescopes.

In the past it has been particularly difficult to build movable mounting systems for heavy devices such as long focal length telescopes and antennas for radar, telemetering, and communication. In may cases it is desirable to have the mounting system provide means for extremely smooth tracking. This has been both costly and difficult to provide because the friction in the supporting bearings is substantial when the supported structure is extremely heavy. The motors which produce movement of the supported structure must have substantial power and starting torque. The present invention provides a method of supporting a heavy device such as a long focal length telescope or a heavy tracking antenna wherein the bearings of any drive system connected to such a device would support substantially none of the weight of the supported device.

In the mounting systems presently known in the art for supporting heavy devices only two axes of rotational freedom are provided and most of these mounting systems cannot provide for the smooth tracking of an object through the zenith. The present invention not only provides a movable mounting system which provides three axes of rotational freedom to the device supported, but it also provides for the tracking by such a device through the zenith to any line of sight position beyond the zenith.

The largest telescope yet constructed is the 200 inch Hale telescope at the Palomar Observatory. It has a 720 inch focal length. The present invention, by providing a mount having a 60 foot diameter sphere as a movable structure in the mounting system, can support a telescope which has a focal length equal to that of the Hale telescope and has an effective field of view exceeding that of the Hale telescope.

It is therefore an object of the present invention to provide a new and unique movable mounting system.

A principal object of the present invention is to provide a new and unique reflecting telescope system which has the effective capabilities equal to or greater than any telescope system presently known in the art.

Another object is to provide a movable mounting system for supporting large devices and providing three axes of rotational freedom to the movement of such large and heavy devices.

A further object is to provide a movable mounting system wherein the movably supported device or structure is supported by fluid floatation so that substantially no weight is placed upon the drive and positioning devices of the system.

An additional object is to provide a reflecting telescope system having a long focal length and also being capable of covering a large field of view by the rotational and radial movement of a multiplicity of primary mirrors.

Another primary object of the present invention is to provide a movable mounting system which completely encloses a supported device in a sphere which has continuous three axis freedom of rotational movement.

Further objects and advantages will become apparent from the following detailed description taken in connection with the accompanying drawings, in which:

FIGURE 1 is an elevational view of a preferred embodiment of the present invention;

FIGURE 2 is a top elevational view of the embodiment of the invention illustrated in FIGURE 1;

FIGURE 3 is a cross-sectional view taken along the lines 3—3 in FIGURE 2 with the optical apertures pointed toward the zenith;

FIGURE 4 is an enlarged side elevational view of a training drive system shown in FIGURE 2;

FIGURE 5 is a top view of the training drive system shown in FIGURE 4;

FIGURE 6 is of the enlarged side elevational view of the elevational and rotational drive system shown in FIGURE 3;

FIGURE 7 is a top elevational view of the elevational and rotational drive system shown in FIGURE 3; and FIGURE 8 is a side sectional view taken along the lines 9—9 in FIGURE 5.

While this invention is susceptible of embodiment in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

Referring now to FIGURES 1 and 2 a reflecting telescope system which incorporates my new and novel movable mounting system is illustrated. The mounting system comprises a mount generally indicated at 10 and a hollow sphere 11 rotatably mounted thereon as will be presently described in greater detail. The sphere 11 has a set of movable apertures generally indicated at 12, mounted thereon. The sphere 11 may be made in any size from that of a model or toy only a few inches in diameter to a large building several hundred feet in diameter. However for the purpose of illustration a 60 foot sphere is illustrated. The mount 10 comprises a square base 20 having an upper floor 21 and a half-sphere container 22 which defines a central cavity. A guard rail 23 is secured to the floor 21. As will be described presently the sphere 23 can be simultaneously continuously rotated about three axes which are perpendicular to each other to give the sphere continuous three axis freedom of rotational movement. Thus, the present invention provides the ultimate goal in gimbal systems in that there are no stops or limitations on continuous movement in all three axes of rotational freedom.

Referring now to FIGURE 3 in addition to FIGURES 1 and 2, the half-sphere container 22 is illustrated in greater detail. The sphere 22 has an inner spherical surface 24, an outer surface 25 and a top surface 26. The sphere 22 may be made in accordance with the sphere structures disclosed in my copending application or by any other suitable method of construction known to those skilled in the art. A track 27 is secured around the top 26 of the half-sphere 22.

An annular training member 30 is rotatably mounted on the half-sphere 22 by a multiplicity of rollers such as 31 and 32 which are rotatably mounted on the annular training member 30. Grooves in the outer perimeter of the rollers engage the track 27 in order that the training member 30 may rotate about a vertical axis. A through the center of the half-sphere 22.

As is illustrated in FIGURE 3, the sphere 11 is received in the central cavity formed by the half-sphere container 22 which contains a fluid 33 in which the sphere 11 floats. The fluid 33 may be water or any other liquid which is sufficiently economical to be utilized for this purpose. For cold weather operation, the liquid should either be an anti-freeze or if water is utilized, it should be sufficiently mixed with an anti-freeze to prevent freezing of the fluid mixture. The weight of the sphere 11 with its internal instrumentation and equipment, the density of the fluid 33, and the surface level of the fluid 33 may all be varied to adjust the vertical level or height of the sphere 11 as it floats in the fluid 33.

A drive means, generally indicated at 34, is connected between the mount 10 and the annular training member 30 to rotate the training member and the sphere 11 about the aforementioned vertical axis. A second drive means, generally indicated at 35, is connected between said annular training member 30 and the sphere 11 to rotate it about a second axis B that is perpendicular to the first or vertical axis A. A third drive means, generally indicated at 36, is connected between the annular training member 30 and the sphere 11 by being mounted on the drive means 35 to rotate the sphere 11 about a third axis C that is perpendicular to the second axis B. As may be best seen in FIGURE 3, all three axes pass through the center of the sphere 11. When the third axis C is pointed to the zenith, it coincides with the first or vertical axis A as illustrated in FIGURE 3. The third axis C is the sighting or line of sight axis of the telescope portion of the reflecting telescope system illustrated in the drawings. When this line of sight of the telescope portion of the system is not pointed to the zenith, then the first and third axis do not coincide as illustrated in FIGURES 1 and 2. In like manner, if the axis C is rotated to a horizontal position, it may be rotated about the vertical axis A continuously.

Referring now to FIGURES 3, 4 and 5, drive means 34 will be described in greater detail. A continuous uniform spiral coil 40 is secured to the top of the training member 30. A plastic worm gear 41 is secured to a shaft 42 which is rotatably mounted in a bracket 43. The bracket 43 is rigidly secured to the half-sphere container 22 and so positioned that spiral groove 44 of the plastic worm gear 41 engages the turns of the coil 40 in order to rotatably drive the annular training member 30 around the track 27 when the worm gear 41 is rotated. A hydraulic motor 45 is secured to the bracket 43 and has a rotating drive shaft 46. A gear 47 is secured to the drive shaft 46 to engage a gear 48 which is secured to the worm gear shaft 42. A suitable hydraulic power system and controls (not shown) is connected to the hydraulic motor 45 for energizing it to rotate the annular training member 30 and thereby the sphere 11. The hydraulic motor 45 and the power and control system connected thereto may be of any suitable type well known to those skilled in the art. A hydraulic motor is utilized in the illustrated preferred embodiment in order to eliminate electrical noise which might be picked up by electrical circuits in instrumentation contained in the sphere 11.

Referring now particularly to FIGURES 6, 7, and 8, the drive means 35 and the drive means 36 will now be described in greater detail. A continuous uniform spiral coil 50 is secured to the outside surface of the sphere 11, and it defines a great circle of the sphere. The spiral coil 50 is uniform and continuous. As shown in FIGURE 6, a bracket 51 is secured to the annular training member 30 and has mounted thereon a hydraulic motor 52 and a gear box 53. The motor 42 drives a chain of gears in the bear box 53 by a driveshaft 54. The gear box 53 has an output drive shaft 55 which is rotatably mounted in a bearing 56 that is secured to the annular training member 30. A bracket 60 is rigidly secured to the end of the shaft 55 for rotation thereby about the axis of the shaft 55. A set of four grooved rollers 61–64 are rotatably secured for free rotation to the bracket 60. As may best be seen in FIGURE 8, the four rollers engage the outer surface of the spiral coil 50 to secure the coil 50 there between. On the opposite side of the annular training ring 30 from the bracket 51, a shaft 65 is rotatably mounted to the training member. This is illustrated in FIGURE 3. Four grooved rollers are rotatably mounted on a bracket 66 which is secured to the shaft 65 for rotation about its axis. The bracket 66 and the four rollers rotatably mounted thereon correspond to the bracket 60 and the rollers 61–64. The rollers on bracket 66 similarly engage the spiral coil 50 therebetween. The bracket 66 is not connected to a motor and therefore is free to rotate when the sphere rotates. The axis of the shaft 55 and the axis of the shaft 65 are in alignment so that the sphere 11 is rotatably secured between the two sets of rollers. Thus, the second axis B coincides with both the axis of the shaft 55 and the axis of the shaft 65. While these elements could have sufficient structural strength to support the sphere 11 without floating it in a fluid, the fluid 33 is maintained at such a level for a given weight of the sphere 11 that substantially none of the weight or buoyant force of sphere 11 is transferred to the rollers, and thereby to the annular training member 30. Therefore, by the adjustment of the weight of the sphere, the density of the fluid 33, and the level of the fluid 33, the two sets of rollers merely hold the sphere 11 in position while it floats in the fluid 33. The structure of the two sets of rollers is sufficiently strong, however, to at least withstand small misadjustments in the floating position of the sphere 11.

Referring again to FIGURES 6–8, a plastic worm gear 70 has a spiral groove 71 therein which engages the spiral coil 50. Worm gear 70 is rigidly secured to a shaft 72 which is rotatably mounted in the bracket 60. A gear 73 is secured to the shaft 72 to engage a gear 74 which is secured to a drive shaft 75 of a hydraulic motor 76. The case of the hydraulic motor 76 is rigidly mounted to the bracket 60 in order to energize the worm gear 70 and thereby rotate the sphere 11 about the third axic C which is the line of sight axis of the telescope system.

Hydraulic motors 52 and 76 are each connected to hydraulic power and control systems (not shown) of any suitable design known to those skilled in the art. Since only hydraulic motors are utilized in the three drive means, they are not a source of electrical noise which may be picked up by electrical circuits in instrumentation placed within the sphere.

The sphere 11 may be made in accordance with the structures disclosed in my copending application for sphere shaped structures or they may be constructed in accordance with any other suitable structural design known to those skilled in the art. The telescope portion of the system mounted within the sphere 11 comprises six Herchelian optical systems which are identical. FIGURE 3 illustrates two of these six optical systems. Since the optical systems contained in the sphere 11 are identical both in structural design and in operation, only one system will be described in detail. A light shield 80 is slidably mounted on the inner surface of the sphere 11 and has a light admitting aperture 81. The shield 80 is so mounted for slidable movement that the aperture 81 moves radially in reference to the line of sight of axis C. During such slideable movement the aperture 81 is aligned with the corresponding aperture of the set of apertures 12 so that light is thereby admitted into the sphere 11, and received by a concave primary mirror 82. The primary mirror 82 is rotatably mounted in the sphere 11 so that it can be rotated in the same plane in which the shield 80 moves. The aperture 81 and the primary mirror 82 are moved radially of the line of sight axis C by a drive means (not shown) which keeps the aperture 81 and the primary mirror in alignment. A flat mirror 83 is secured to a hollow cone 84. The hollow cone 84 is rigidly secured to a television camera 85 which is rigidly secured to the slidable shield 80 by a bracket 86. The flat mirror 83 is the secondary mirror of the Herchelian optical system and is so positioned relative to the primary mirror 82 that it provides a Herchelian focus adjacent the television camera 85 in order that the camera 84 may receive an optical image produced by the mirrors 82 and 83. The prime focus of the primary mirror 82 when this Herchelian optical system is receiving light substantially parallel to the line of sight axis C is at a point 87. The prime focus of the primary mirrors of the six optical systems substantially coincide when the systems are aligned with the line of sight axic C. The primary mirrors such as 82 always remain in alignment with their respective secondary mirrors such as 83, while they are being moved radially of the line of sight axis C. Therefore, each Herchelian optical system can be moved relative to the line of sight axis from a "dead ahead" position, which causes the six images to overlap, to positions which are approximately five degrees divergent from the "dead ahead" position. By utilization of controls (not shown), each optical system may be swept radially outward from the line of sight in synchronization with the movements of the other optical systems or each optical system may be swept independently of the others. The optical systems can be swept radially while the sphere is being rotated about the line of sight. By such combined movements a long focal length optical system is provided which has the data gathering capability of a 200 inch mirror or larger. The reflecting telescope system illustrated in the drawings has the capability (by sweeping the multiplicity of Newtonian optical systems in the sphere 11 and rotating the sphere about its line of sight axis) to have the information gathering capability of the 200 inch telescope at Palomar at a greatly reduced cost of construction.

Those skilled in the art will recognize that any number of optical systems may be utilized, as desired, from one up to a large number. Further, those skilled in the art will recognize that prime focus optical system, a Cassegrainian system, or any other optical system well known to those skilled in the art, may be substituted for the Newtonian systems illustrated. Those skilled in the art will also recognize that the mounting systems could readily contain or support various antennas for radars, communication and telemetering antennas. Thus, the movable mounting system described herein can be used to support and carry various types of optical spectrum and radio spectrum instrumentation, or various combinations thereof. All such various modifications and combinations are intended to be included within the scope of the appended claims.

A modification of the embodiment of the invention shown in the drawings may be made by eliminating the annular training member 30 and its drive means 34 and mounting the drive means 35 and the shaft 65 directly on the container 22 in the same manner that they are mounted on the training member 30. The sphere 11 will then have only two degrees of movement, but in some applications only two degrees of movement are required. Thus if only two degrees of movement are required, all annular rings are eliminated from the mounting system.

An alternate modification to the aforestated two degrees of movement modification of the invention would be to eliminate drive means 35 and provide a second drive means 36 and second shaft 65 with rollers mounted on container 22, and a second spiral coil mounted on sphere 11 at a 90° position to the spiral coil 50 to be received by the second drive means similar to drive means 36.

What is claimed is:
1. A movable mounting system comprising:
   a mount defining a central cavity containing a fluid,
   an annular training member rotatably mounted on said mount around said cavity for rotation about a first axis passing through said cavity,
   a hollow sphere rotatably located within said annular training member and substantially floating in said fluid,
   drive means connected between said mount and said annular training member to rotate said annular member and said sphere about said first axis, and
   drive means connected between said annular training member and said sphere to rotate it about a second axis that is perpendicular to said first axis.

2. A movable mounting system as specified in claim 1 wherein said central cavity has a spherical shape.

3. In combination with the movable mounting system specified in claim 1, a drive means connected between said annular training member and said sphere to rotate it about a third axis that is perpendicular to said second axis.

4. A reflecting telescope system comprising in combination with the movable mounting system specified in claim 3,
   an aperture means movably mounted in said sphere for admitting light,
   at least one concave mirror having a prime focus movably mounted inside said sphere, and
   means for moving said light admitting aperture and said prime focus radially of said third axis connected to said aperture means and said mirror, said aperture means and said prime focus remaining in alignment.

5. In combination with the reflecting telescope system specified in claim 4, at least one television camera movably mounted adjacent a focus and receiving an optical image produced by said mirror, said camera being connected to said means for moving said aperture and mirror to move in coordination therewith.

6. A reflecting telescope system comprising:
   a mount,
   a hollow body rotatably mounted on said mount to have three axes of rotational freedom,
   an aperture means in said sphere for admitting light,
   at least one concave mirror having a prime focus movably mounted inside said body and optically aligned with said aperture, and
   means for moving said prime focus radially of an axis of one of said axes of rotational freedom comprising a flat mirror rigidly mounted on a movable mounting means and control means mounted in said hollow body and connected to said mounting means and connected to said concave mirror to maintain said mirrors optically aligned as said flat mirror mounting means is moved by said control means.

7. In combination with the reflecting telescope system specified in claim 6, at least one television camera movably mounted adjacent a focus and receiving an optical image produced by said mirror, said camera being connected to said means for moving said aperture and mirror to move in coordination therewith.

References Cited

UNITED STATES PATENTS

| | | |
|---|---|---|
| 481,625 | 8/1892 | Ritchie. |
| 1,045,142 | 11/1912 | Hartness _____ 350—85 |
| 1,429,588 | 9/1922 | Hayford et al. |
| 1,580,298 | 4/1926 | Henderson _____ 350—85 X |
| 2,962,925 | 12/1960 | Kasson et al. _____ 350—85 X |
| 2,966,591 | 12/1960 | McCartney _____ 350—6 |
| 3,050,995 | 8/1962 | Dozier. |
| 3,257,728 | 6/1966 | Blomquist _____ 350—85 |
| 2,366,410 | 1/1945 | Klempere et al. _____ 350—85 X |
| 751,569 | 2/1904 | Spear _____ 350—85 |
| 1,428,935 | 9/1922 | Bell _____ 350—83 X |
| 3,118,340 | 1/1964 | Iwerks _____ 350—299 X |

FOREIGN PATENTS

| | | |
|---|---|---|
| 720,087 | 12/1954 | Great Britain. |
| 768,128 | 7/1949 | Germany. |
| 880,503 | 5/1953 | Germany. |
| 1,284,168 | 1/1962 | France. |
| 35,519 | 10/1930 | Netherlands. |
| 1,327,649 | 7/1961 | France. |

PAUL R. GILLIAM, Primary Examiner

U.S. Cl. X.R.

350—82, 85, 299, 310